US012613799B2

(12) United States Patent
Go

(10) Patent No.: US 12,613,799 B2
(45) Date of Patent: Apr. 28, 2026

(54) APPARATUS AND A METHOD FOR MANAGING A MEMORY DEVICE BASED ON A READ OPERATION

(71) Applicant: SK hynix Inc., Gyeonggi-do (KR)

(72) Inventor: Ga Eul Go, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 31 days.

(21) Appl. No.: 18/406,221

(22) Filed: Jan. 8, 2024

(65) Prior Publication Data

US 2025/0077412 A1 Mar. 6, 2025

(30) Foreign Application Priority Data

Sep. 4, 2023 (KR) ........................ 10-2023-0116676

(51) Int. Cl.
*G06F 12/02* (2006.01)
(52) U.S. Cl.
CPC ................................ *G06F 12/0246* (2013.01)

(58) Field of Classification Search
None
See application file for complete search history.

(56) References Cited

U.S. PATENT DOCUMENTS

| | | | |
|---|---|---|---|
| 9,552,171 B2 | 1/2017 | Huang et al. | |
| 9,564,233 B1* | 2/2017 | Cho | ..................... G11C 11/5628 |
| 10,026,488 B2 | 7/2018 | Reusswig et al. | |
| 11,287,998 B2 | 3/2022 | Muchherla et al. | |
| 2021/0034274 A1* | 2/2021 | Muchherla | ......... G11C 16/3495 |

\* cited by examiner

*Primary Examiner* — Baboucarr Faal
(74) *Attorney, Agent, or Firm* — IP & T GROUP LLP

(57) ABSTRACT

A memory device includes an open memory block and control circuitry. The open memory block includes at least one first page having an erased state. The control circuitry is configured to perform a read operation for a page included in the open memory block, and apply a weight determined based on a ratio of the at least one first page in the open memory block to calculate a read count subject to the read operation.

8 Claims, 10 Drawing Sheets

| Open % | Select | Shared | Unselect |
|--------|--------|--------|----------|
| 65<X | 2.2 | 2 | 1 |
| 0<X≤65 | 1 | 1 | 1 |
| X=0 | 1 | 1.3 | 2.3 |

FIG. 9

| BLOCK# | RD_COUNT |
|--------|----------|
| 1 | 1.2 |
| 2 | 16 |
| 3 | 5 |
| 4 | 60 |
| 5 | 42.1 |
| 6 | 9.1 |
| 7 | 70.5 |
| 8 | 36.7 |
| 9 | 101 |
| 10 | NULL |
| ... | ... |
| Z | 157.7 |

APPARATUS AND A METHOD FOR MANAGING A MEMORY DEVICE BASED ON A READ OPERATION

CROSS-REFERENCE TO RELATED APPLICATIONS

This patent application claims the benefit of priority under 35 U.S.C. § 119(a) to Korean Patent Application No. 10-2023-0116676, filed on Sep. 4, 2023, the entire disclosure of which is incorporated herein by reference.

TECHNICAL FIELD

One or more embodiments of the present disclosure described herein relate to a memory device, and more particularly, to an apparatus and an operation method for managing the memory device based on a read operation performed therein.

BACKGROUND

A data processing system including a memory system or a data storage device can store more amounts of data in the data storage device and store data in the data storage device more quickly. The memory system has been developed to output data stored in the data storage device more quickly. The data storage device may include non-volatile memory cells and/or volatile memory cells for storing data.

BRIEF DESCRIPTION OF THE DRAWINGS

The description herein makes reference to the accompanying drawings wherein like reference numerals refer to like parts throughout the figures.

FIG. 7 illustrates operating states of memory cells according to another embodiment of the present disclosure.

FIG. 8 describes weights according to an embodiment of the present disclosure.

FIG. 9 describes the read count of a memory device according to an embodiment of the present disclosure.

DETAILED DESCRIPTION

Figure 1:
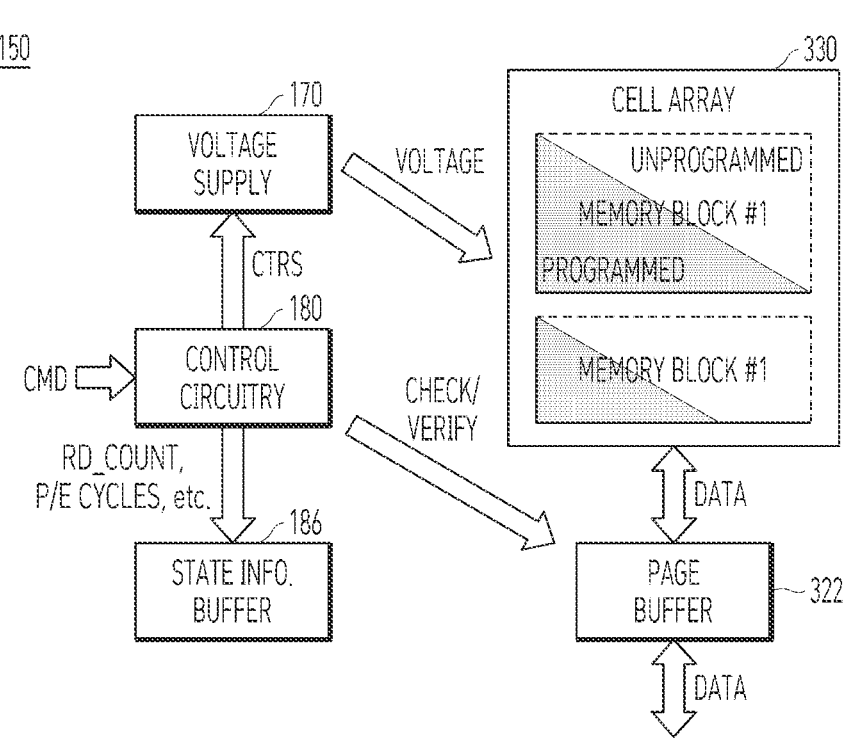
FIG. 1 illustrates a memory device according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational, e.g., is not turned on nor activated. Examples of block/unit/circuit/component used with the "configured to" language include hardware, circuits, memory storing program instructions executable to implement the operation, etc. Additionally, "configured to" can include a generic structure, e.g., generic circuitry, that is manipulated by software and/or firmware, e.g., an FPGA or a general-purpose processor executing software to operate in a manner that is capable of performing the task(s) at issue. "Configured to" may also include adapting a manufacturing process, e.g., a semiconductor fabrication facility, to fabricate devices, e.g., integrated circuits that are adapted to implement or perform one or more tasks.

As used in this disclosure, the term 'machine,' 'circuitry' or 'logic' refers to all of the following: (a) hardware-only circuit implementations such as implementations in only analog and/or digital circuitry and (b) combinations of circuits and software and/or firmware, such as (as applicable): (i) to a combination of processor(s) or (ii) to portions of processor(s)/software including digital signal processor(s), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'machine,' 'circuitry' or 'logic' applies to all uses of this term in this application, including in any claims. As a further example, as used in this application, the term 'machine,' 'circuitry' or 'logic' also covers an implementation of merely a processor or multiple processors or a portion of a processor and its (or their) accompanying software and/or firmware. The term 'machine,' 'circuitry' or 'logic' also covers, for example, and if applicable to a particular claim element, an integrated circuit for a storage device.

As used herein, the terms 'first,' 'second,' 'third,' and so on are used as labels for nouns that they precede, and do not imply any type of ordering, e.g., spatial, temporal, logical, etc. The terms 'first' and 'second' do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term 'based on' is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Embodiments of the present disclosure may provide a memory device and a memory system including the memory device, which can be configured to: determine read disturbance which occurred by a read operation based on a ratio of a region or an area in which any data entry is not programmed in an open memory block (i.e., an open area ratio) when the read operation is performed in the open memory block in a memory device; and determine a read count of the open memory block by applying a weight that varies in response to the open area ratio in order to reflect a difference in read disturbances which occurred by read operations.

In addition, an embodiment of the disclosed disclosure can provide a memory device or a memory system including a memory device, which can be configured to determine read counts of open memory blocks by applying weights that vary depending on an open area ratio and whether or not strings are shared in order to reflect a difference in read disturbances depending on read operations occurring in the open memory blocks of the memory device having a structure in which a plurality of memory blocks share a string.

In an embodiment of the present invention, a memory device can include an open memory block including at least one first page having an erased state; and control circuitry configured to perform a read operation for a page included in the open memory block, and apply a weight determined based on a ratio of the at least one first page in the open memory block to calculate a read count subject to the read operation.

The control circuitry can be configured to determine the weight to increase the read count by more than twice in a case that the ratio is greater than a first threshold, compared to when the ratio is equal to less than the first threshold.

The preset threshold can be determined based on program/erase (P/E) cycles of the open memory block.

The control circuitry can determine the weight higher in a case that a first string of the page in the open memory block shares a layer with a second string in another memory block, compared to when the layer is not shared by the first and second strings.

The control circuitry can be configured to determine, when all pages in the open memory block are programmed, the weight higher in a case that a first string of the page in the open memory block shares a layer with a second string in another memory block, compared to when the first string does not share the layer with the second string.

The control circuitry can determine the weight higher for the first string than for the second string.

The control circuitry can be further configured to perform data migration from the open memory block to a free memory block when the read count is higher than a second threshold.

The control circuitry can be further configured to change the open memory block to a closed memory block when the open memory block does not include the at least one first page having the erase state after a program operation; and calculate a read count for the closed memory block without applying the weight.

In another embodiment, a memory system can include a memory device comprising plural memory blocks; and a controller configured to perform a read operation for a page included in at least one open memory block among the plural memory blocks, determine a weight based on a ratio of unprogrammed pages in the at least one open memory block, and calculate a read count subject to the read operation based on the weight.

The memory device and the controller can transmit and receive data via plural channels. The memory device can include memory dies or memory planes coupled to the controller via the plural channels. The at least one memory block can be included in the memory dies or the memory planes.

The controller can be further configured to calculate the ratio based on a number of pages having an erased state in the at least one memory block when a physical address translated from a logical address input along with a read command indicates the at least one open memory block.

The controller can be further configured to: store logical-physical address mapping information regarding data stored in the page in the at least one open memory block; and calculate a size of data to be stored in the at least one open memory block based on the logical-physical address mapping information.

The controller can be further configured to determine the weight to increase the read count by more than twice in a case that the ratio is greater than a first threshold, compared to when the ratio is equal to less than the first threshold.

The first threshold can be 65%.

The controller can be further configured to store an operation state including the read count regarding the at least one open memory block and information regarding whether a first string of the page in the open memory block shares a layer with a second string in another memory block based on information regarding configuration delivered from the memory device.

The controller can be further configured to update the operation state regarding the at least one open memory block and an operations state regarding the another memory block in which the second string shares the layer with the first string.

The controller can be configured to determine, when all pages in the open memory block are programmed, the weight higher in a case that a first string of the page in the at least one open memory block shares a layer with a second string in another memory block, compared to when the first string does not share the layer with the second string.

The controller can determine the weight higher for the first string than for the second string.

The controller can be further configured to: change the at least one open memory block to at least one closed memory block when the at least one open memory block does not include the at least one first page having the erase state after a program operation; and perform data migration from the at least one open memory block to a free memory block when the read count is higher than a second threshold.

The program operation can include a dummy data program operation for dummy memory cells in the memory device.

These and other features and advantages of the invention will become apparent from the detailed description and the accompanying drawings of embodiments of the present disclosure. Embodiments will now be described with reference to the accompanying drawings, wherein like numbers reference like elements.

FIG. 1 illustrates a memory device according to an embodiment of the present disclosure.

Referring to FIG. 1, the memory device 150 may include a cell array 330. The cell array 330 may have a two-dimensional or three-dimensional structure. The cell array 330 may include a plurality of memory cells capable of storing data and a plurality of switch transistors configured to control connections between the plurality of memory cells and a bit line, a source line, etc. The structure of the cell array 330 will be described later with reference to FIGS. 2 and 5.

The memory device 150 may include control circuitry 180. The control circuitry 180 may receive a command CMD input from an outside of the memory device. The command CMD may be transmitted from the controller 130/400 (see FIGS. 10 and 11) or the host 102 (see FIG. 10). For example, the command CMD may be for outputting data stored in the cell array 330, storing data in the cell array 330, or erasing data stored or remaining in the cell array 330. According to an embodiment, the command CMD may be used to check an operating state of the memory device 150 or to perform an operation to improve input/output performance, lifespan, wear, etc. of the memory device 150.

The control circuitry 180 that receives the command CMD may transmit a control signal CTRS to a voltage supply circuit 170. The voltage supply circuit 170 may generate at least one voltage in response to the control signal CTRS and transmit the at least one voltage to the cell array 330. For example, in response to the control signal CTRS, the voltage supply circuit 170 may supply a read voltage to a memory cell in which read data is stored and a pass voltage to another memory cell coupled to the corresponding memory cell. The voltage supply circuit 170 may transmit various voltages capable of determining turn-on or turn-off of the plurality of switch transistors to the cell array 330 in response to the control signal CTRS.

During a read operation, the cell array 330 may output data stored in a memory cell to a page buffer 322 in response to at least one voltage applied by the voltage supply circuit 170. Additionally, during a program operation, data stored in the page buffer 322 may be stored in the memory cell within the cell array 330. When the control circuitry 180 tries to erase data stored in a plurality of memory cells, the data stored in the plurality of memory cells included in a preset unit or group (e.g., a memory block) in the cell array 330 may be erased together. In addition to data input/output operations for the memory cell in the cell array 330, the control circuitry 180 may control operations of the plurality of switch transistors in the cell array 330. The cell array 330 can output data stored in a specific memory cell, in response to operation states of the plurality of switch transistors based on plural voltages input from the voltage supply circuit 170.

Referring to FIG. 1, the cell array 330 may include a plurality of memory blocks. Two memory blocks MEMORY BLOCK #1, MEMORY BLOCK #2 in the cell array 330 are open memory blocks. The memory block included in the cell array 330 may change state depending on a storage state of data, to a state of showing whether data is programmable, etc. For example, among a plurality of memory blocks, a memory block in which all data has been erased and new data can be programmed may be called a free memory block.

Additionally, a memory block in which data program operations can no longer be performed because all pages therein are programmed with data among a plurality of memory blocks may be called a closed memory block. Among a plurality of memory blocks, a memory block in which data has been programmed in a part and new data can be programmed in another part may be called an open memory block.

Read disturbance may occur during a process of reading data stored in a memory block. In the memory device 150, read disturbance may refer to an unintentional change of data stored in an adjacent memory cell during a read operation. This may occur because the read operation can cause a small amount of voltage stress in adjacent memory cells, causing charges to move or be displaced. If the number of read operations increases significantly, voltage stresses can be accumulated and lead to data corruption. To avoid or mitigate issues due to read disturb, the memory device 150 may use techniques such as data migration and wear leveling to ensure that memory cells are used evenly, thereby reducing overall stress on a particular set or group of memory cells. Depending on an embodiment, issues due to read disturbance may be avoided or reduced by using a read count subject to a read operation performed on each memory block in the memory device 150. Distortion of data due to read disturb will be described later in FIG. 7.

Depending on the structure or operating state of the memory block, data distortion due to read disturb may be different. Due to read disturbance, a closed memory block in which data is stored in all pages may have different data distortion from an open memory block in which data is not programmed in at least some page. In the closed memory block, all pages are already programmed with data. In a process of reading the programmed data therein, read disturbance can occur in adjacent memory cells, distorting the already programmed data. On the other hand, there are pages in the open memory block in which data has not yet been programmed. In the process of reading data stored in the open memory block, read disturbance may not occur in pages in which data is not stored.

In the closed memory block, data is stored in all pages, and data stored in each page can be generated through an equalizer to reduce cell-to-cell interference (CCI). When a read operation is performed on the closed memory block, the read disturbance effect that may occur due to the read operation may have a difference within a preset level. Generally, when the read operation is performed, the read count of the memory block on which the read operation was performed may be constantly increased by a preset number (e.g., '1'). If the read count exceeds a preset threshold or an increase rate or ratio of the read count exceeds a preset threshold, it may be determined that stability of the data stored in the corresponding memory block has been lowered due to read disturbance.

However, the open memory block in the memory device 150 may have different operating characteristics from the closed memory block. Data is programmed in some pages within the open memory block, but other pages are not programmed with data. Therefore, when a read operation is performed on the data stored at some pages in the open memory block, the read disturb effect due to the read operation may have a volatility exceeding a preset level, unlike in the closed memory block. For example, when a ratio of pages in which data is not programmed in the open memory block (e.g., an open area ratio) is higher than a preset reference, the read disturb effect may increase, as compared to other cases. Additionally, the read disturb effect may vary depending on whether a string of the open memory block is shared with another memory block, the difference between a string on which a read operation was performed and another string on which a read operation was not performed, etc. In response to a read operation performed on the open memory block included in the memory device 150 according to an embodiment of the present disclosure, a weight used for calculating a read count RD_COUNT may be set differently depending on an operation state (e.g., the open area ratio) and an internal structure of the open memory block. This will be described later with reference to FIG. 8.

Referring to FIG. 1, in the first memory block (MEMORY BLOCK #1) in the cell array 330, data is programmed in 50% of the pages, and data is not programmed in the other 50% of the pages. In the second memory block (MEMORY BLOCK #2) in the cell array 330, data is programmed in approximately 30% of the pages, and data is not programmed in the remaining 70% of the pages. A plurality of open memory blocks may be included in the cell array 330. Each open memory block may have data programmed corresponding to a same page amount or different page amounts. Further, to increase data input/output speed, the memory device 150 can program data in parallel in multiple locations or read data stored in the multiple locations in parallel (e.g., an interleaving way or method). To support the interleaving way or method, at least one open memory block may be included in each memory die or each memory plane of the memory device 150.

An amount of data stored in the first memory block (MEMORY BLOCK #1) and the second memory block (MEMORY BLOCK #2) may be different. Further, ratios of pages (e.g., the open area ratio) in which no data is stored in the first memory block (MEMORY BLOCK #1) and the second memory block (MEMORY BLOCK #2) may be different. Then, a first read operation to read data stored in the first memory block (MEMORY BLOCK #1) and a second read operation to read data stored in the second memory block (MEMORY BLOCK #2) may be performed. At this time, the read disturb that occurs due to the first read operation in the first memory block (MEMORY BLOCK #1) and the read disturb that occurs due to the second read operation in the second memory block (MEMORY BLOCK #2) might not be the same. In the memory device 150 according to an embodiment of the present disclosure, to reflect different read disturbances according to an open area ratio of an open memory block in a process of calculating the read count RD_COUNT, different weights can be applied according to the open area ratio. Read counts RD_COUNT for different open memory blocks could be calculated based on different weights. The control circuit 180 can store status information of the cell array 330 or plural memory blocks (MEMORY BLOCK #1, MEMORY BLOCK #2), such as the read count RD_COUNT or a program-erase cycle (P/E CYCLES), in a status information buffer 186.

Figure 2:
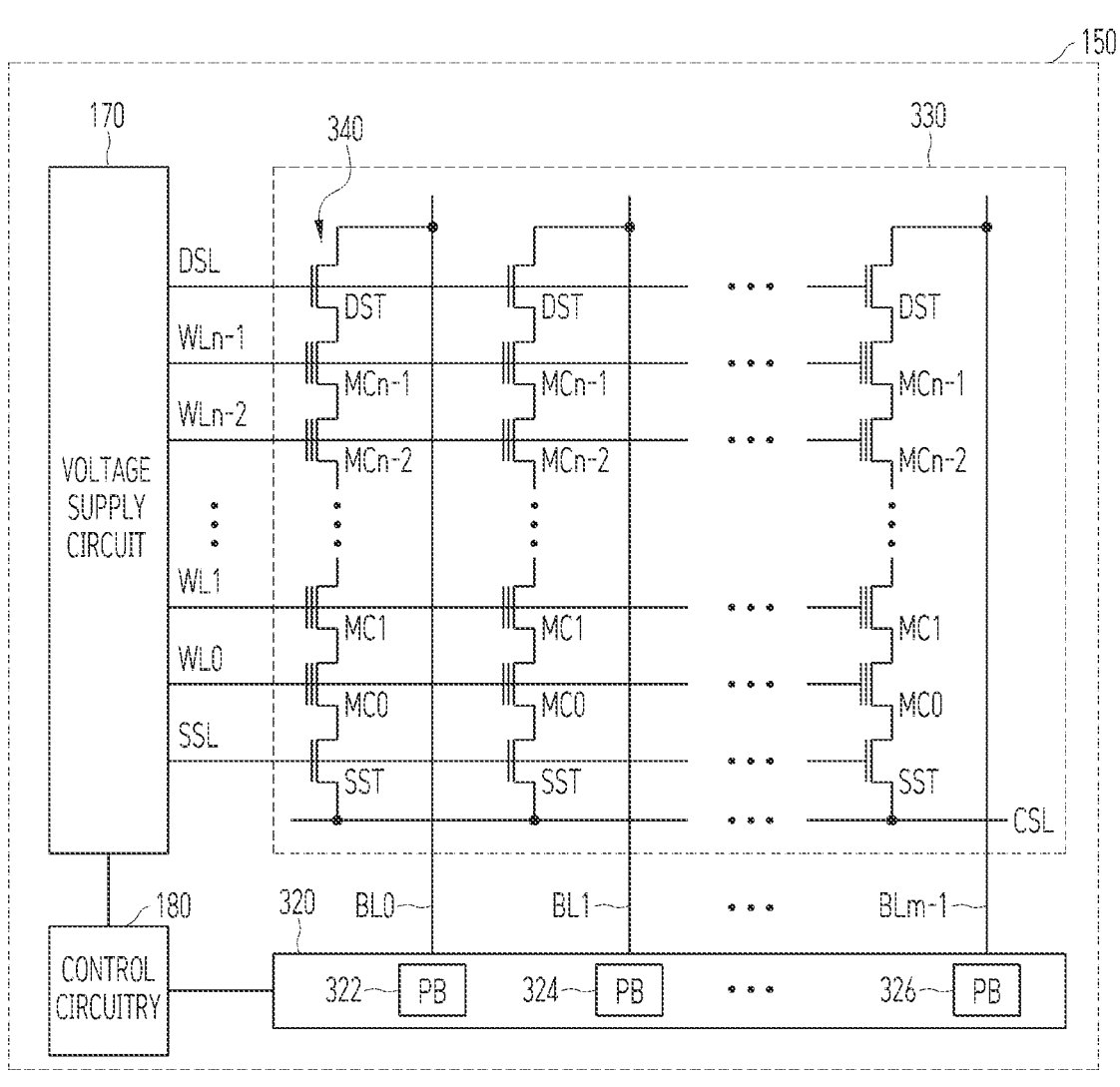
FIG. 2 illustrates a memory device according to another embodiment of the present disclosure.

FIG. 2 illustrates a memory device according to another embodiment of the present disclosure. Specifically, FIG. 2 illustrates a memory cell group (e.g., a cell array) included in a memory plane or a memory die included in the memory device 150 according to an embodiment of the present disclosure.

Referring to FIG. 2, the memory device 150 may include at least one memory group 330 having a plurality of cell strings 340. Each cell string 340 may include a plurality of non-volatile memory cells MC0 to MCn-1 connected to a respective bit line of a plurality of bit lines BL0 to BLm-1. The cell strings 340 are disposed in respective columns of the memory group 330, and each cell string 340 can include at least one drain select transistor DST and at least one source select transistor SST. The non-volatile memory cells MC0 to MCn-1 of each cell string 340 may be connected in series between a drain select transistor DST and a source select transistor SST. Each of the non-volatile memory cells MC0 to MCn-1 may be configured as a multi-level cell (MLC) that stores a data item having plural bits per cell. The cell strings 340 may be electrically connected to corresponding bit lines of the bit lines BL0 to BLm-1.

In an embodiment, the memory group 330 may include NAND-type flash memory cells MC0 to MCn-1 shown in FIG. 2. In another embodiment, the memory group 330 can be implemented as a NOR-type flash memory, a hybrid flash memory in which at least two different types of memory cells are mixed or combined, or a one-chip NAND flash memory in which a controller is embedded in a single memory chip. In an embodiment, the memory group 330 can include a flash memory cell including a charge trap flash (CTF) layer that includes a conductive floating gate or insulating layer.

According to an embodiment, the memory device 150 shown in FIG. 2 can include at least one memory block. The memory group 330 can have a two-dimensional (2D) or three-dimensional (3D) structure. For example, each of the memory blocks in the memory device 150 may be implemented as a 3D structure, for example, a vertical structure. Each of the memory blocks may have a three-dimensional structure extending along first to third directions, for example, an x-axis direction, a y-axis direction, and a z-axis direction.

The memory group 330 including at least one memory block can be coupled to a plurality of bit lines BL, a plurality of source selection lines SSL, a plurality of drain selection lines DSL, a plurality of word lines WL, a plurality of dummy word lines DWL, and a plurality of common source lines CSL. In one embodiment, the memory group 330 can include a plurality of NAND strings NS which, for example, may respectively correspond to cell strings 340. Each NAND string NS may include a plurality of memory cells MC and may be connected to a respective bit line of the bit lines BL. In addition, the source select transistor SST of each NAND string NS may be connected to a common source line CSL, and the drain select transistor DST of each NAND string NS can be connected to a corresponding bit line BL. In each NAND string NS, the memory cells MC may be arranged between the source select transistor SST and the drain select transistor DST.

The memory device 150 may include the voltage supply circuit 170 which can supply a word line voltage e.g., one or more predetermined voltages such as a program voltage, a read voltage, and a pass voltage, for respective word lines of the word lines according to an operation mode, or may supply a voltage to a bulk, e.g., a well region, in which each memory block including the memory cells MC are formed. In this case, a voltage generating operation of the voltage supply circuit 170 may be performed under control of the control circuitry 180. Also, the voltage supply circuit 170 may generate a plurality of variable read voltages to distinguish a plurality of data items from each other.

In response to the control of the control circuitry 180, one of the memory blocks (or sectors) of the memory cell array may be selected, and one of the word lines of the selected memory block may be selected. Word line voltages may be supplied to the selected word line and the unselected word line of the memory group 330, individually. The voltage supply circuit 170 may include a voltage generation circuit for generating target voltages having various levels, which are applicable to word lines of the memory group 330.

The memory device 150 may also include a read/write circuit 320 controlled by the control circuitry 180. The read/write circuit 320 may operate as a sense amplifier or a write driver according to an operation mode. For example, in a verify operation and a read operation, the read/write circuit 320 may operate as a sense amplifier for reading the data item from the memory cell array. In a program operation, the read/write circuit 320 may operate as a write driver that controls potentials of bit lines according to a data item to be stored in the memory cell array. The read/write circuit 320 may receive the data item to be programmed to the cell array from page buffers during the program operation. The read/write circuit 320 can drive bit lines based on the input data item. To this end, the read/write circuit 320 may include a plurality of page buffers (PB) 322, 324, 326, with each page buffer corresponding to each column or each bit line, or each column pair or each bit line pair. According to an embodiment, a plurality of latches may be included in each of the page buffers 322, 324, 326. According to an embodiment, the number of latches or page buffers coupled to each bit line can be equal to, or greater than, the number of bits of data stored in the memory cells MC.

The page buffers 322, 324, 326 may be coupled to a data input/output device, e.g., a serialization circuit or a serializer, through a plurality of buses BUS. When each of the page buffers 322, 324, 326 is coupled to the data input/output device through different buses, a delay that may occur in data transmission from the page buffers 322, 324, 326 can be reduced. For example, each page buffer 322, 324, 326 can perform the data transmission without a waiting time.

According to an embodiment, the memory device 150 may receive a write command, write data, and information, e.g., a physical address, regarding a location in which the write data is to be stored. The control circuitry 180 causes the voltage supply circuit 170 to generate a program pulse, a pass voltage, etc., used for a program operation performed in response to a write command, and to generate one or more voltages used for a verification operation performed after the program operation.

When a multi-bit data item is programmed in non-volatile memory cells included in the memory group 330, the error rate might be higher than that when a single-bit data item is stored in the non-volatile memory cells. For example, an error in the non-volatile memory cells may be induced due to cell-to-cell interference (CCI). To reduce error in the non-volatile memory cells, a width (deviation) of a threshold voltage distribution, corresponding to stored data items between the non-volatile memory cells, should be reduced.

To this end, the memory device 150 can perform an incremental step pulse programming (ISPP) operation to effectively make a narrow threshold voltage distribution of the non-volatile memory cells. In an embodiment, the memory device 150 can use the ISPP operation for multi-step program operations. For example, the memory device 150 may divide a program operation into a Least Significant Bit (LSB) program operation and a Most Significant Bit (MSB) operation according to a predetermined order between the non-volatile memory cells or pages.

A multi-bit value programmed in a memory cell in a NAND flash memory (e.g., NAND-type flash memory cells MC0 to MCn−1 in the memory group 330) can be determined based on a threshold voltage window or a threshold voltage distribution to which the cell's threshold voltage belongs. As a size of each memory cell shrinks and more bits (e.g., 3-bit, 4-bit, or 5-bit) of data are programmed per memory cell, a width of the threshold voltage window used to represent each multi-bit value becomes narrower, increasing an error rate when determining the multi-bit value stored in the memory cell. This is because process variations become more widespread when an amount of charge stored in each memory cell decreases with a feature size, resulting in large differences in threshold voltages of different memory cells storing the same value. As a result, it becomes increasingly difficult to determine which value a threshold voltage of a memory cell corresponds to.

According to an embodiment, the control circuitry 180 may include a read retry table (RRT). The RRT may be stored in the memory device 150. A read error may occur in a process of applying a read voltage to a non-volatile memory cell in the memory device 150 through a word line and reading data stored in the non-volatile memory cell. The control circuitry 180 in the memory device 150 may manage information regarding a read retry mechanism for resolving read errors. One of the information regarding the read retry mechanism is the read RRT. The read retry mechanism uses the RRT for a recorded location where the error has occurred, so that the memory device 150 can ensure data integrity by applying an appropriate correction value (e.g., changing a read voltage level) when re-reading.

Figure 3:
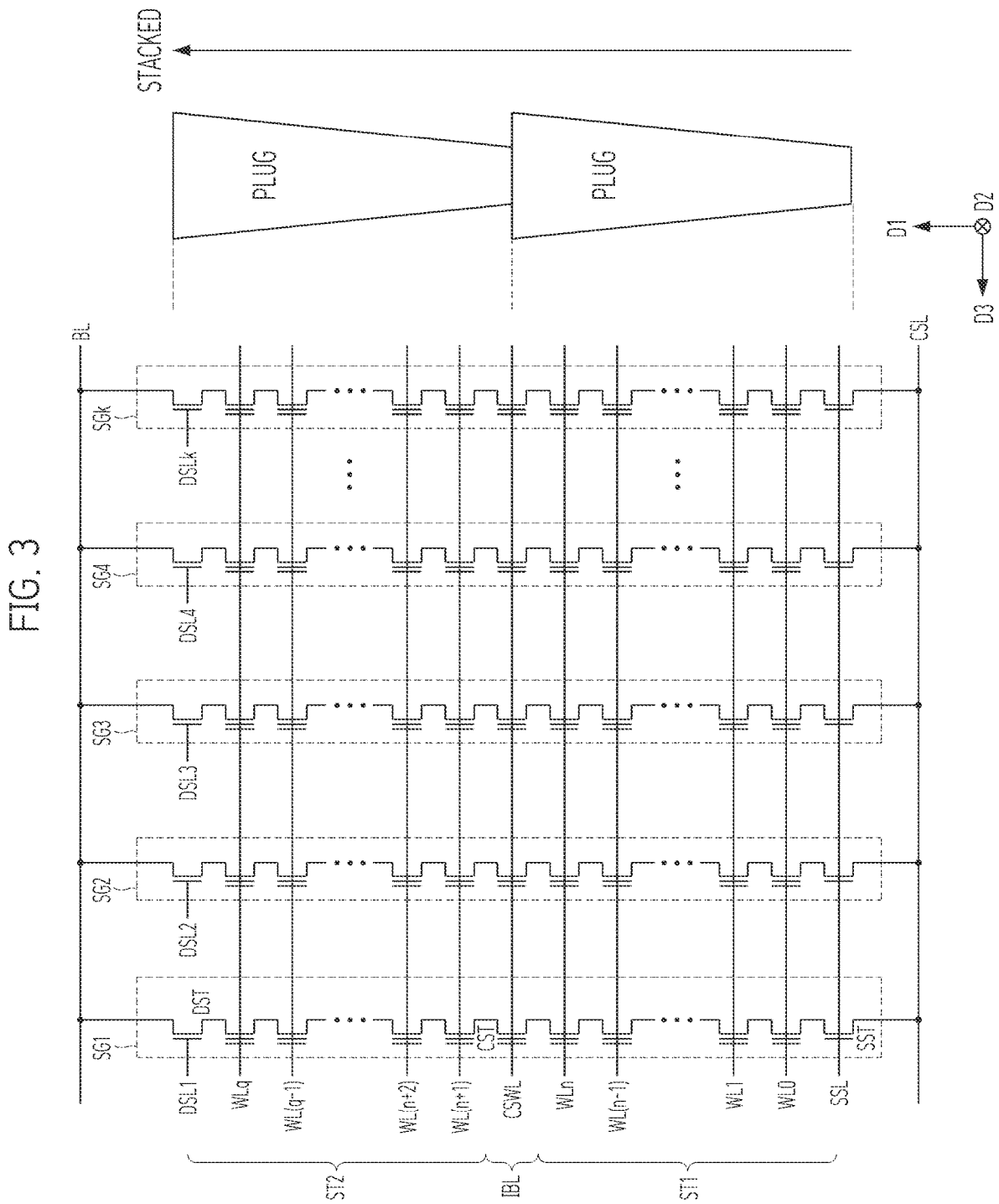
FIG. 3 illustrates a memory cell array according to another embodiment of the present disclosure.

FIG. 3 illustrates a memory cell array according to another embodiment of the present disclosure.

Referring to FIG. 3, the memory cell array may have a structure including portions or layers stacked in a vertical direction D1. The memory cell array may include at least one memory block. Hereinafter, a direction substantially perpendicular to the upper surface of the substrate may be defined as a first direction D1, and two directions parallel to the upper surface of the substrate and intersecting each other may be defined as the second direction D2 and the third direction D3, individually. For example, the second direction D2 and the third direction D3 may intersect each other substantially perpendicularly. The first direction D1 may be referred to as a vertical direction, the second direction D2 may be referred to as a row direction, and the third direction D3 may be referred to as a column direction. The direction indicated by the arrow in the drawing and the direction opposite to it are described as the same direction.

For convenience of description, FIG. 3 shows NAND strings or cell strings SG1 to SGk connected to one bit line BL and one common source line CSL among the cell strings included in the memory block.

The memory block may include a plurality of cell strings SG1 to SG5 connected between the same bit line (BL) and the common source line CSL. Each of the cell strings SG1 to SGk can include at least one source select transistor SST controlled by a source select line SSL, plural memory cells controlled by word lines WL, a central switching transistor CST disposed in an intermediate boundary layer IBL and controlled by a central switching word line CSWL, and a drain select transistor DST controlled by each drain select line DSL1, DSL2, DSL3, . . . , DSLk.

According to an embodiment, plural memory cells connected to at least one word line located at both ends of first and second stacks ST1, ST2 in the first direction D1 may be dummy cells. Any data may not be stored in the dummy cells. Further, according to an embodiment, the dummy cells may be used to store data having a smaller number of bits than other memory cells. According to an embodiment, the intermediate boundary layer IBL may include at least one gate line. One gate line corresponds to the central switching word line CSWL which can simultaneously control switching operations of the central switching transistors CST connected thereto. Further, although FIG. 3 illustrates a structure in which the first and second stacks ST1, ST2 are stacked, three or more stacks may be vertically stacked in the cell array 330. When a plurality of stacks are stacked, an intermediate boundary layer IBL may be formed and disposed between each two stacked stacks. The intermediate boundary layer IBL may include at least one switching transistor configured to couple memory cells in one stack of the two stacks to other memory cells in the other stack.

FIG. 3 shows an embodiment in which the source select transistors SST included in the plurality of cell strings SG1 to SGk are connected to the common selection line CSL. However, according to an embodiment, a certain number of source select transistors could be coupled to each of plural source ground selection lines.

Referring to FIGS. 1 to 3, the cell array 330 can include a plurality of memory blocks arranged along a plurality of directions D1, D2, D3. In an embodiment, a memory block may be selected by the control circuitry 180 shown in FIGS. 1 and 2. For example, a read voltage, a program voltage, or an erase voltage may be applied to a memory block and a word line selected by the control circuitry 180.

Each of the cell strings SG1 to SGk may include a plurality of switch transistors as well as a plurality of memory cells capable of storing data. Here, the plurality of switch transistors can include a drain select transistor DST, a source select transistor SST, and a central switching transistor CST. FIG. 3 shows an embodiment in which each of the cell strings SG1 to SGk includes one drain select transistor DST, one source select transistor SST, and one central switching transistor CST, respectively. However, according to an embodiment, each of the cell strings SG1 to SGk may include a plurality of drain select transistors DST, a plurality of source select transistors SST, or a plurality of intermediate switching transistors CST.

Figure 4:
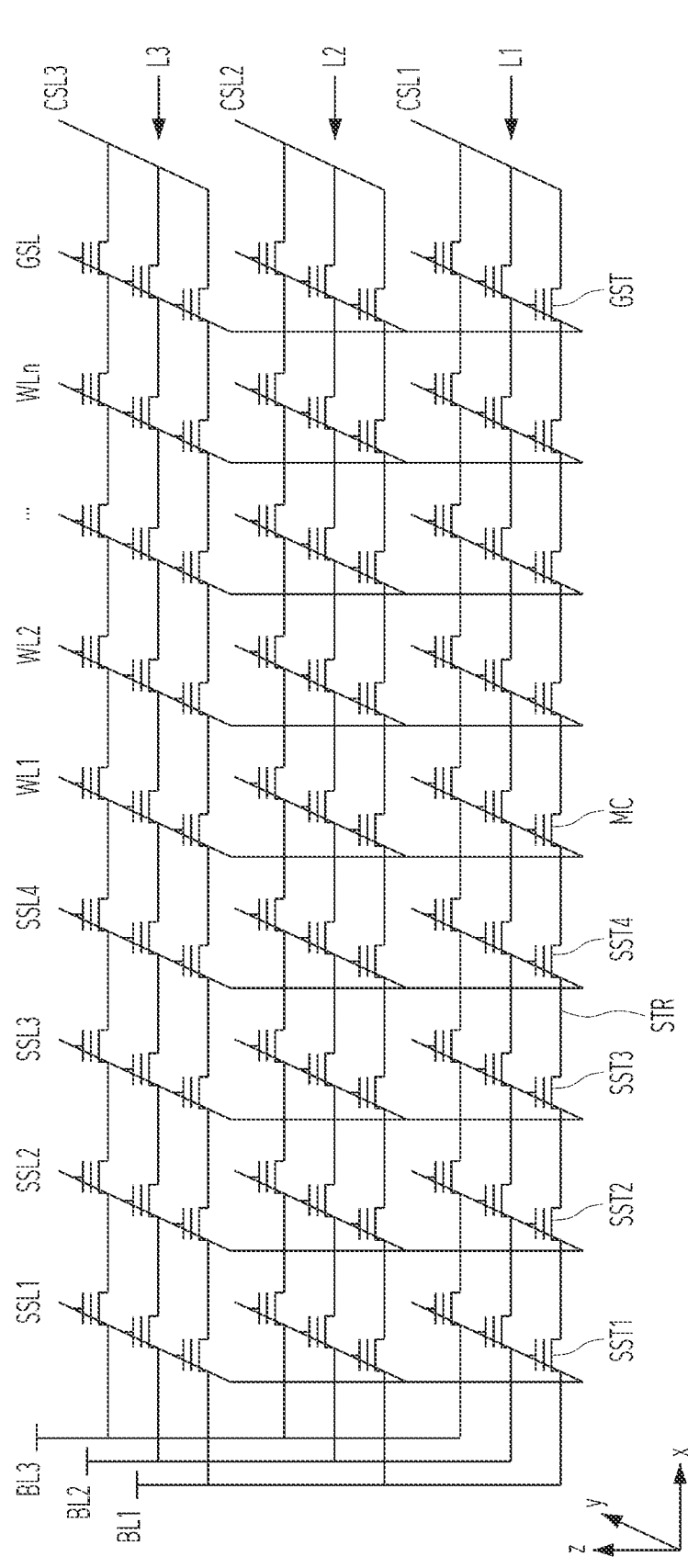
FIG. 4 shows a cell array structure according to an embodiment of the present disclosure.

FIG. 4 shows a cell array structure according to an embodiment of the present disclosure.

Referring to FIGS. 3 and 4, the memory device 150 may be stacked in the vertical direction (D1, Z) through a plurality of stacks ST1, ST2, as described in FIG. 3, and non-volatile memory cells can be placed in three-dimensional (3D) space. Specifically, FIG. 4 illustrates a cell array in a 3D non-volatile memory device according to an embodiment of the present disclosure.

The memory device 150 may include a plurality of memory cells MC arranged in a cell string STR in a plurality of memory layers (e.g., three memory layers L1, L2, L3). Each memory layer L1, L2, L3 is connected to a plurality of bit lines BL1, BL2, BL3 through a first end of the plurality of channel lines CL and to the common source line CSL through a second end of the plurality of channel lines CL. The memory device 150 may include a plurality of source selection lines SSL1 to SSL4 connected to source select transistors SST1 to SST3. In addition, a plurality of word lines WL1 to WLn and a ground selection line GSL may be connected to each of the memory layers L1, L2, L3. The plurality of source selection lines SSL1 to SSL4, the plurality of word lines WL1 to WLn, and the ground selection line GSL may be arranged in a direction that intersects a plurality of channel lines CL. Each of the plurality of channel lines may be described as the cell string STR. Each of the cell strings STR may include the source select transistors SST1 to SST4 respectively connected to the plurality of source selection lines SSL1 to SSL4. The ground selection line GSL may be grounded to turn off the ground selection transistor GST.

The plurality of word lines WL1 to WLn may each be connected to control gates of memory cells arranged in a column direction. Each of the plurality of bit lines BL1 to BL3 may be connected to one end of the source select transistors. A plurality of memory cells having control gate electrodes connected to each word line WL1 to WLn in the row direction can configure a page, which is a unit for storing data or a data entry. The number of pages could be changed or determined depending on a storage capacity of the memory cells.

Figure 5:
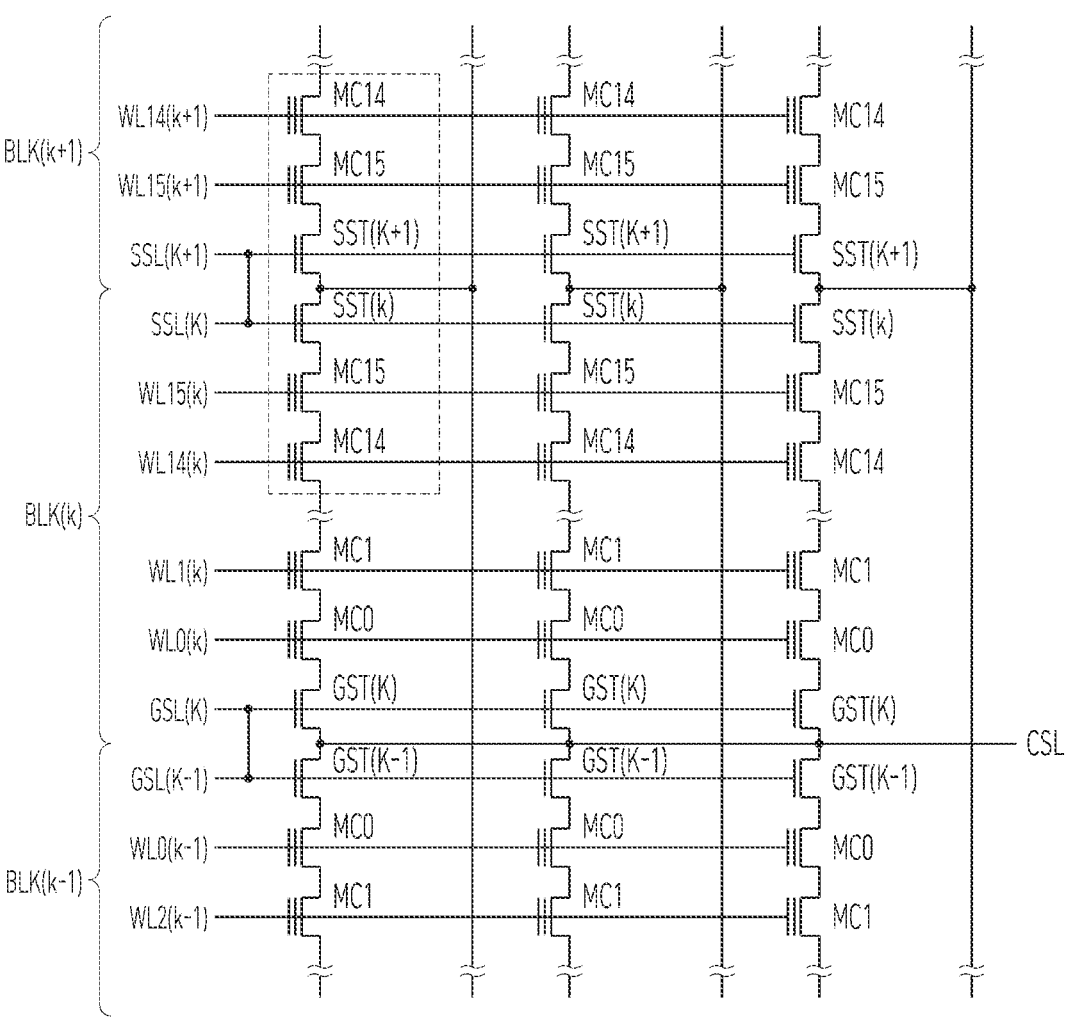
FIG. 5 shows a cell array structure according to an embodiment of the present disclosure.

FIG. 5 shows a cell array structure according to an embodiment of the present disclosure. Specifically, FIG. 5 describes an internal configuration of the cell array 330 described in FIG. 1.

Referring to FIGS. 1 and 5, the cell array 330 within the memory device 150 may include a plurality of memory blocks BLK (k+1), BLK (k), BLK (k−1). FIG. 5 illustrates three memory blocks BLK (k+1), BLK (k), BLK (k−1), but the cell array 330 can include a plurality of memory blocks arranged in two or three dimensions. In FIG. 5, each memory block BLK (k+1), BLK (k), BLK (k−1) has plural memory cells coupled to 16 word lines WL0 to WL15. The 16 word lines WL0 to WL15 and a ground selection line GSL in a direction perpendicular to a row or a bit line could be placed in parallel. However, the number of word lines included in each memory block may vary depending on an embodiment. Each memory block BLK (k+1), BLK (k), BLK (k−1) may include a cell string corresponding to each bit line. In a memory block (e.g., BLK (k)), each cell string may be connected to a source select transistor SST (k) and a ground select transistor GST (k) coupled to the corresponding bit line. The cell string may include 16 memory cells MC15 to MC0 connected in series between a common source line CSL and the string and ground select transistors SST (k), GST (k). The number of memory cells included in the cell string may correspond to the number of word lines. The source select transistor SST (k), the memory cells MC15 to MC0, and the ground select transistor GST (k) are individually connected to a source selection line SSL (k), the word lines WL15 to WL0, and a ground selection line GSL (k).

Referring to FIGS. 1 to 5, as the memory device 150 is designed to store more data, source selection lines of adjacent memory blocks arranged in two or three dimensions may be electrically connected to each other. Further, the ground selection lines for the adjacent memory blocks may be electrically connected to each other. For example, the source selection line SSL (k) of the memory block BLK (k) may be electrically connected to the source selection line SSL (k+1) of the adjacent memory block BLK (k+1). Further, adjacent string/ground select transistors along a bit line can share a contact to achieve electrical connection between adjacent string/ground select lines.

When designed to share a ground selection line or a cell string between adjacent memory blocks, the disturb effect resulting from a read or write operation performed on a specific memory block can affect adjacent memory blocks (e.g., memory blocks with shared cell strings but not selected). Here, a scheme in which cell strings are shared between adjacent memory blocks can include a structure in which cell strings share a same component using an electrode or a functional layer such as any area or any semiconductor layer stacked on the semiconductor substrate or a body electrode formed in a trench of the semiconductor substrate where the cell strings are formed. Additionally, when designed to share a ground selection line or a cell string for adjacent memory blocks, the disturb effect due to the read or write operation performed on a specific memory block among the adjacent memory blocks may be greater than a case where the cell string are not shared by the adjacent memory blocks. Because there is a difference in the read disturb effect according to a read operation on an open memory block depending on whether a cell string is shared by adjacent memory blocks of the memory device 150, the memory device 150 can apply different weights in a process of calculating the read count RD_COUNT.

Figure 6:
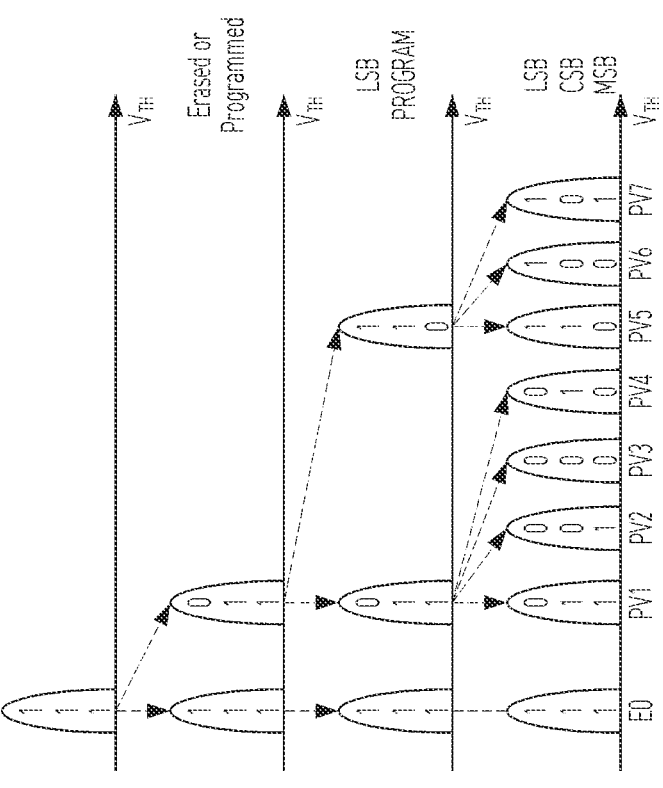
FIG. 6 shows a program state of a memory cell according to an embodiment of the present disclosure.
Figure 6:
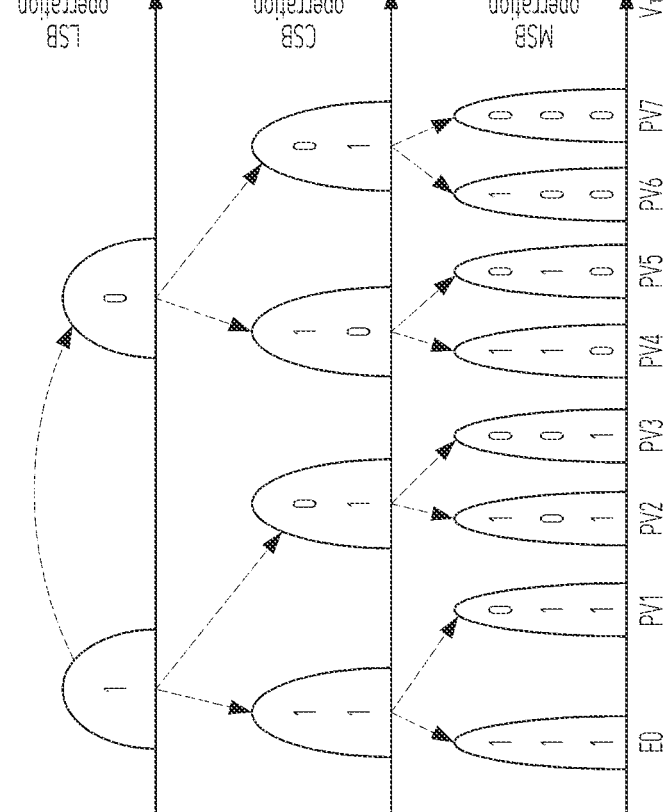

FIG. 6 shows a program state of a memory cell according to an embodiment of the present disclosure.

Referring to FIGS. 1 and 6, multi-bit data may be programmed in a memory cell within the cell array 330. FIG. 6 shows various methods of programming 3 bits of data in each memory cell. Although FIG. 6 illustrates two types of multi-bit data programming, the method of performing a multi-bit data program operation may vary depending on an embodiment.

For example, a program operation for storing 3 bits of data in each memory cell can be divided into a unit operation for programming each data. The program operation for storing multi-bit data can include an LSB (Least Significant Bit) operation for storing LSB data in a memory cell in the erase state, a CSB (Central Significant Bit) operation for storing CSB data, and an MSB (Most Significant Bit) operation for storing MSB data.

According to another embodiment, the program operation for storing 3 bits of data in each memory cell can include a first program operation that distinguishes an erased memory cell maintained in an erased state from a programmed memory cell changed to a programmed state, a second program operation for storing LSB data, and a third program operation for storing the remaining two-bit data (i.e., CSB data, MSB data).

As described above, depending on which data is programmed in a memory cell during a program operation, a threshold voltage of the corresponding memory cell may vary. In the closed memory block, data is programmed into all pages within the memory block. Accordingly, a memory cell included in the closed memory block may have one of the eight states E0, PV1 to PV7 described in FIG. 6. Additionally, as described in FIG. 1, data generated through an equalizer may be stored for each page so that memory cells within a memory block are not biased toward a specific data distribution.

On the other hand, in the open memory block, a memory cell in an area where data is programmed may have one of eight states E0, PV1 to PV7 described in FIG. 6. However, memory cells belonging to areas where data is not programmed in the open memory block may remain in an erased state E0. Additionally, according to an embodiment, it is likely that, although LSB (Least Significant Bit) data is programmed in a memory cell in the open memory block, two-bit data (i.e., CSB data, MSB data) may not yet be programmed. When a read operation is performed to read data of a specific page already stored in memory cells within the open memory block (i.e., when a read voltage is applied to the memory cells through a selected word line and a pass voltage is applied through unselected word lines), at least some memory cells within unprogrammed pages can be affected. Therefore, depending on an operating state (e.g., the open area ratio) of the open memory block, deviation of the read disturb effect according to the read operation may increase.

Figure 7:
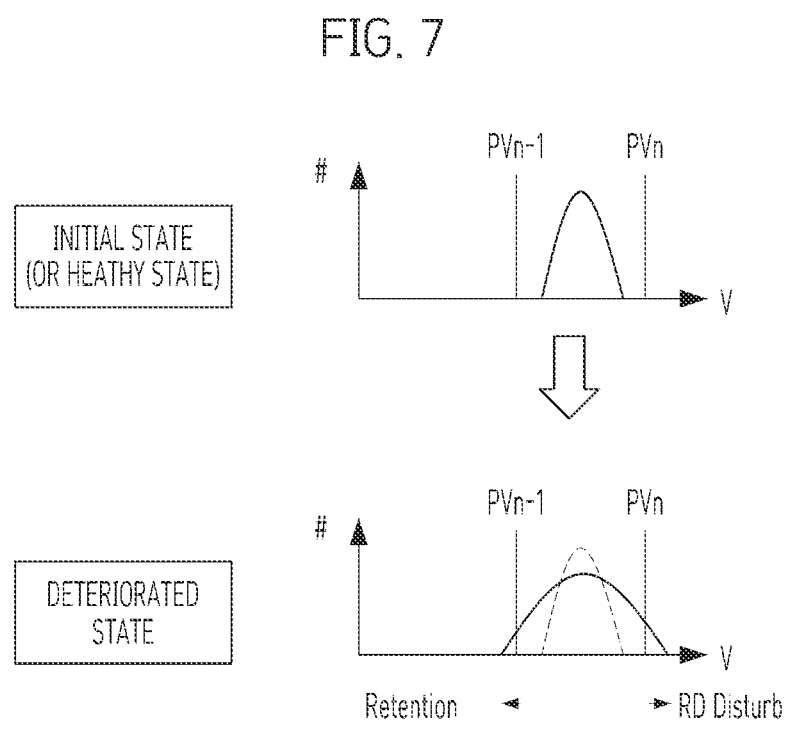

FIG. 7 illustrates operating states of memory cells according to another embodiment of the present disclosure. Specifically, FIG. 7 shows a change in threshold voltage of a memory cell according to an embodiment of the present disclosure.

Referring to FIGS. 1 to 6, the cell strings 340 or cell strings SG1 to SGm included in the cell array 330 in the memory device 150 may include a plurality of memory cells. Additionally, before a read operation is performed, the memory cell may have one of eight states E0, PV1 to PV7 described in FIG. 6.

When data is input/output to/from the memory device 150, deterioration may occur in memory cells included in the cell strings 340 or the cell strings SG1 to SGm. As program-erase cycles (P/E Cycle) of the memory block in the memory device 150 increases, temperature in the memory device 150 increases or a high-level voltage is used in the memory device 150, threshold voltage distribution of memory cells included in the cell strings 340 and the cell strings SG1 to SGm may not be maintained constant. For example, the plurality of memory cells may be programmed to have a specific state (e.g., one of E0, PV1 to PV7). When a first reference voltage PVn−1 and a second reference voltage PVn are applied to the plurality of memory cells, it could be determined that a threshold voltage distribution of some memory cells can be placed between the first reference voltage PVn−1 and the second reference voltage PVn. That is, the data stored in the corresponding memory cell can be determined as a specific value (e.g., one of E0, PV1 to PV7 such as '011', '010', etc.) corresponding to the threshold voltage distribution between the first reference voltage PVn−1 and the second reference voltage PVn.

In the closed memory block, if the data stored in the memory block is not used (not accessed) for a long time, the memory cell in which the data is programmed might be left unattended for a long time (e.g., data retention time is long). In this case, the threshold voltage of the corresponding memory cell may gradually decrease.

The open memory block is a memory block that is being used to program new data. When a read operation is performed to read data stored in the open memory block, a high-level voltage (e.g., a read voltage, a pass voltage, etc.) is repeatedly applied to the memory cell. In this case, read disturbance may occur due to a read operation, so that threshold voltages of memory cells may increase.

For example, as described in FIG. 6, the memory cell having the erase state E0 is a lower threshold voltage than memory cells having other program states PV1 to PV7. Based on programmed states of the memory cells, the read disturbance effect due to a high level read voltage may be greater. When a read voltage is repeatedly applied to a memory cell in the open memory block, threshold voltages of the memory cells having the erase state E0 may increase up to the first program state PV1. When data is programmed into a corresponding memory cell so that the threshold voltage of the corresponding memory cell increases to be the second program state PV2, an error might not occur from the corresponding memory cell. However, there are cases where data should not be programmed into the corresponding memory cell (e.g., when data of '111' must be maintained in a specific memory cell). If a threshold voltage of the corresponding memory cell has already increased from the erase state E0 to the first program state PV1 due to read operations, an error may occur from the corresponding memory cell.

If a threshold voltage of a memory cell is lowered or higher, the threshold voltage of the corresponding memory cell may be out of the range between the first reference voltage PVn−1 and the second reference voltage PVn for reading data stored in the corresponding memory cell, so that the corresponding memory cell becomes in a deteriorated state. If the memory cell is in the deteriorated state, the data stored in the memory cell could not be read accurately. In this case, the data stored in the memory cell can be read through a read retry operation performed after changing reference voltages, such as the first reference voltage PVn−1 and the second reference voltage PVn, for the read operation.

Figure 10:
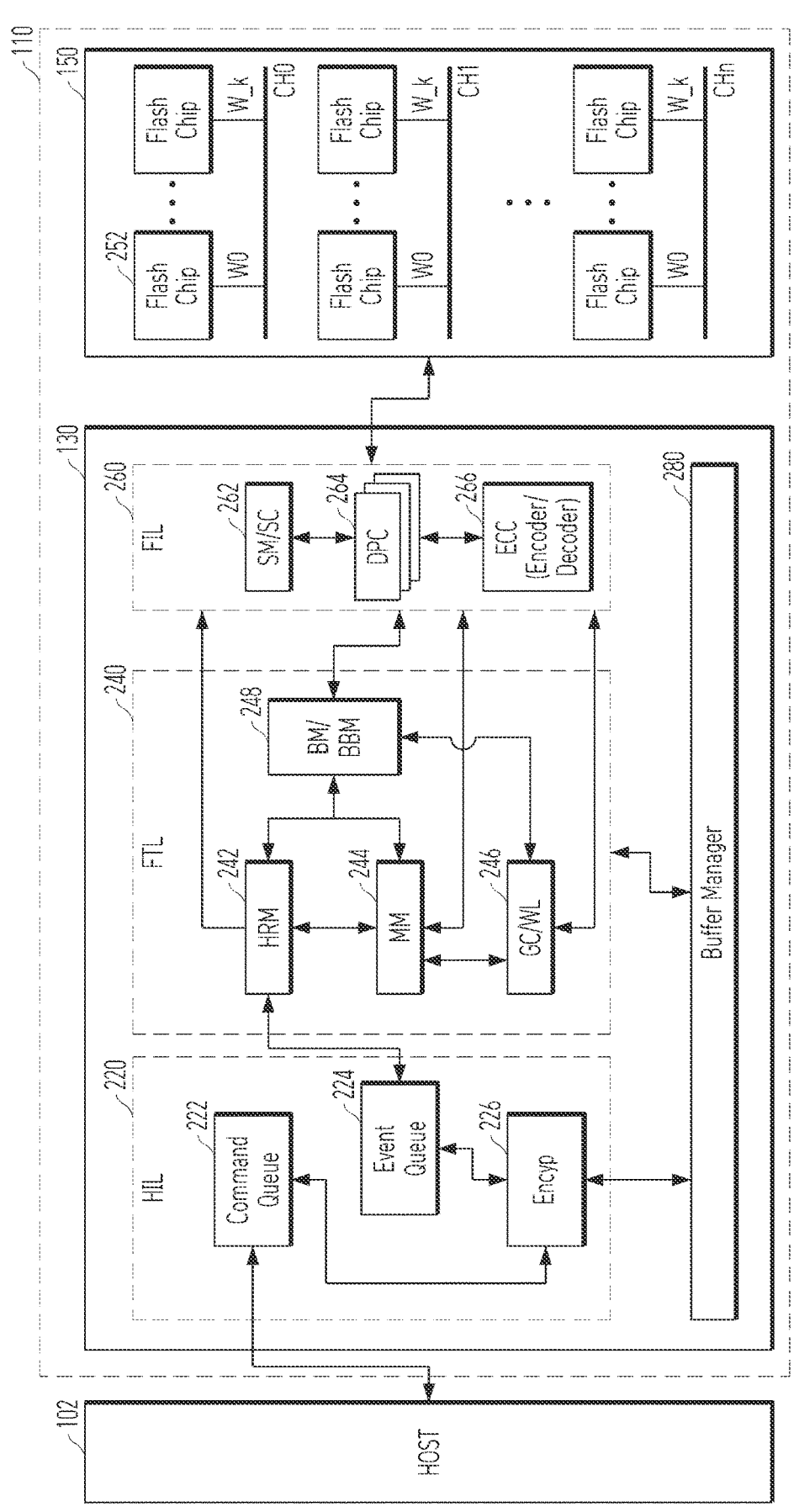
FIG. 10 illustrates a memory system according to another embodiment of the present disclosure.
Figure 11:
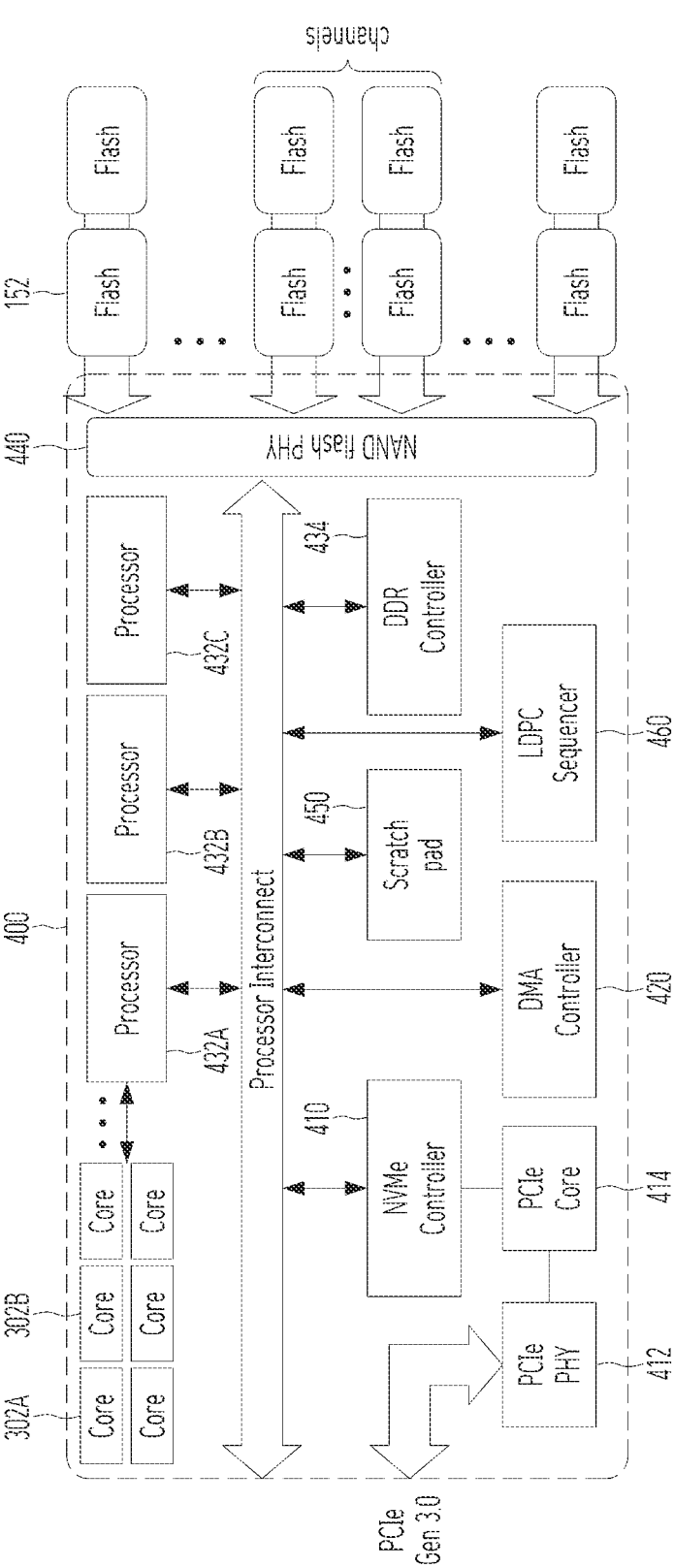
FIG. 11 illustrates a memory system according to another embodiment of the present disclosure.

In addition, when deterioration occurs only in some memory cells, errors could be corrected through the ECC module 266 (see FIG. 10) included in the memory system 110 including the memory device 150 (see FIGS. 10 and 11). However, if the number of deteriorated memory cells increases, an error correction range of the ECC module 266 may be exceeded.

Even if errors could be corrected through the read retry operation and the ECC module 266, data input/output performance of the memory device 150 and the memory system 110 may be degraded. Additionally, if the error correction range of the ECC module 266 is exceeded, an uncorrectable ECC error (UECC) may occur and data safety may deteriorate.

The memory device 150 and the memory system 110 according to an embodiment of the present disclosure can recognize deterioration of threshold voltages of memory cells due to read disturb through the read count RD_COUNT. To this end, a process of determining and calculating the read count RD_COUNT needs to be performed to reflect the read disturbance effect more accurately. The memory device 150 and the memory system 110 may apply weights to calculate the read count RD_COUNT by more accurately reflecting the read disturbance effect that may occur due to a read operation performed on the open memory block.

FIG. 8 describes weights according to an embodiment of the present disclosure.

Referring to FIG. 8, the weight for calculating the read count RD_COUNT may vary depending on the open area ratio (Open %) in the open memory block and the structure of cell strings shared by plural memory blocks. The open area ratio (Open %) may refer to a ratio of unprogrammed area (or pages) in which data is not programmed in the open memory block. For example, if the open memory block includes 100 pages and data has been programmed in 65 of the 100 pages, the open area ratio (Open %) of the open memory block is 35%. If the open area ratio (Open %) of the open memory block is 100%, it may indicate that the corresponding memory block has now been allocated for a program operation, but no data has been programmed yet in the open memory block.

The weight of the selected cell string (Select) can be 2.2 times greater in a case that the open area ratio of an open memory block is greater than 65%, compared to a case that the open area ratio is less than 65% and greater than 0%. This may indicate that the read disturbance effect is about 2.2 times greater in a case that the open area ratio is greater than 65%, compared to a case that the open area ratio is less than 65% and greater than 0%.

As to a shared cell string (Shared), the weight may be doubled in a case that the open area ratio of an open memory block is greater than 65%, compared to a case that the open area ratio is less than 65% and greater than 0%. Additionally, the weight in the structure of shared cell string (Shared) may be 1.3 times greater in a case that the open area ratio is 0%, compared to the case that the open area ratio is less than 65% and greater than 0%.

As to an unselected cell string (Unselect), the weight for the unselected cell string (Select) is 2.3 times greater in a case that the open area ratio is 0%, compared to the case that the open area ratio is greater than 0%.

The open area ratio (Open %) ranges (e.g., 65%, 100%) and the weights (e.g., 1.3 times, 2 times, 2.2 times, 2.3 times) shown in FIG. 8 can be determined corresponding to operating characteristics of the memory device 150, which could be obtained or secured through data input/output tests. Depending on an embodiment, criteria for the open area ratio (Open %) and the number of criteria for determining the weights may vary.

Additionally, the range for the open area ratio (Open %) may vary depending on a degree or level of wear of the memory device 150. For example, the degree of wear of the memory block in the memory device 150 may be estimated through the program-erase cycles (P/E Cycles) for the open memory block. Depending on a wear level of the open memory block, the read disturbance effect occurring in the corresponding memory block may vary. Therefore, based on the program-erase cycles (P/E Cycles), the ranges (e.g., 35%, 100%) of the open area ratio (Open %) can be changed or the number of ranges can be changed (increased or decreased). When determining weights in these ways, it is possible to calculate the read count RD_COUNT that reflects the read disturbance effect more accurately.

FIG. 9 describes the read count of a memory device according to an embodiment of the present disclosure.

Referring to FIG. 9, the read count RD_COUNT for a plurality of memory blocks (1 to Z) included in the memory device 150 will be described. If the read count RD_COUNT is calculated according to the number of read operations performed within the memory block, the read count RD_COUNT can be determined to be an integer value (e.g., 1, 2, 3, . . . , 100, . . . , 200, etc.). However, as described in FIG. 8, the read count RD_COUNT is not determined solely based on the number of read operations performed in the memory device 150. However, a weight may be used and applied for calculating the read count RD_COUNT in order to reflect the read disturbance effect due to the read operation. For example, when a read operation is performed on the open memory block, the read count RD_COUNT may increase by '2' or '2.2' instead of '1'. Accordingly, the read count RD_COUNT for the plurality of memory blocks 1 to Z included in the memory device may be expressed as a rational number (e.g., 1.2, 42.1, 36.7, etc.) rather than an integer. Depending on an embodiment, if there is no valid data among the memory blocks in the memory device or if an erase operation is performed to generate a free memory block (e.g., 10), the read count RD_COUNT of the free memory block may be initialized or nullified (NULL).

Through the read count RD_COUNT for each memory block, the deterioration of memory cells within the corresponding memory block can be accurately estimated. If the read count RD_COUNT exceeds a preset threshold or the increase rate of the read count RD_COUNT exceeds a preset threshold, data safety of the corresponding memory block may matter. In this case, valid data stored in the corresponding memory block can be migrated to another memory block (e.g., another open memory block or a free memory block) within the memory device 150 such as data migration, read reclaim, wear level, or garbage collection.

FIG. 10 illustrates a data processing system according to an embodiment of the present disclosure.

Referring to FIG. 10, the data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

The memory device 150 can include plural memory chips 252 coupled to the controller 130 through plural channels CH0, CH1, . . . , CHn and ways W0, . . . , W_k. The memory chip 252 can include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells. Each memory plane or each memory die can support an interleaving mode in which plural data input/output operations are performed in parallel or simultaneously. According to an embodiment, memory blocks included in each memory plane, or each memory die, included in the memory device 150 can be grouped to input/output plural data entries as a super memory block. An internal configuration of the memory device 150 shown in FIG. 10 may be changed based on operating performance of the memory system 110. An embodiment of the present disclosure may not be limited to the internal configuration described in FIG. 10.

According to an embodiment, the memory device 150 and the controller 130 may be components or elements functionally divided. Further, according to an embodiment, the memory device 150 and the controller 130 may be implemented with a single chip or a plurality of chips.

The controller 130 may perform a data input/output operation (such as a read operation, a program operation, an erase operation, etc.) in response to a request or a command input from an external device such as the host 102. For example, when the controller 130 performs a read operation in response to a read request input from an external device, data stored in a plurality of non-volatile memory cells included in the memory device 150 is transferred to the controller 130. Further, the controller 130 can independently perform an operation regardless of the request or the command input from the host 102. Regarding an operating state of the memory device 150, the controller 130 can perform an operation such as garbage collection (GC), wear leveling (WL), a bad block management (BBM) for checking whether a memory block is bad and handling a bad block.

Each memory chip 252 can include a plurality of memory blocks. The memory blocks may be understood to be a group of non-volatile memory cells in which data is removed together by a single erase operation. Although not illustrated, the memory block may include a page which is a group of non-volatile memory cells that store data together during a single program operation or output data together during a single read operation. For example, one memory block may include a plurality of pages. The memory device 150 may include a voltage supply circuit capable of supplying at least one voltage into the memory block. The voltage supply circuit may supply a read voltage Vrd, a program voltage Vprog, a pass voltage Vpass, or an erase voltage Vers into a non-volatile memory cell included in the memory block.

The host 102 interworking with the memory system 110, or the data processing system 110 including the memory system 110 and the host 102, is a mobility electronic device (such as a vehicle), a portable electronic device (such as a mobile phone, an MP3 player, a laptop computer, or the like), and a non-portable electronic device (such as a desktop computer, a game machine, a TV, a projector, or the like). The host 102 may provide interaction between the host 102 and a user using the data processing system 100 or the memory system 110 through at least one operating system (OS). The host 102 transmits a plurality of commands corresponding to a user's request to the memory system 110, and the memory system 110 performs data input/output operations corresponding to the plurality of commands (e.g., operations corresponding to the user's request).

Referring to FIG. 10, the controller 130 in a memory system operates along with the host 102 and the memory device 150. As illustrated, the controller 130 may have a layered structure including the host interface (HIL) 220, a flash translation layer (FTL) 240, and the memory interface layer or flash interface layer (FIL) 260.

The host interface layer (HIL) 220, the flash translation layer (FTL) 240, and the memory interface layer or flash interface layer (FIL) 260 described in FIG. 10 are illustrated as one embodiment. The host interface layer (HIL) 220, the flash translation layer (FTL) 240, and the flash interface layer (FIL) 260 may be implemented in various forms according to the operating performance of the memory system 110. According to an embodiment, the host interface layer (HIL) 220, the flash translation layer (FTL) 240, and the flash interface layer (FIL) 260 can perform operations through multi cores or processors having a pipelined structure included in the controller 130.

The host 102 and the memory system 110 may use a predetermined set of rules or procedures for data communication or a preset interface to transmit and receive data therebetween. Examples of sets of rules or procedures for data communication standards or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIe or PCI-e), Serial-attached SCSI (SAS), Serial Advanced Technology Attachment (SATA), Mobile Industry Processor Interface (MIPI), and the like. According to an embodiment, the host 102 and the memory system 110 may be coupled to each other through a Universal Serial Bus (USB). The Universal Serial Bus (USB) is a highly scalable, hot-pluggable, plug-and-play serial interface that ensures cost-effective, standard connectivity to peripheral devices such as keyboards, mice, joysticks, printers, scanners, storage devices, modems, video conferencing cameras, and the like.

The memory system 110 may support the non-volatile memory express (NVMe). The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., x1, x4, x8, or x16) to achieve high speed data communication over several hundred MB per second. According to an embodiment, the PCIe scheme may achieve bandwidths of tens to hundreds of Giga bits per second.

A buffer manager 280 in the controller 130 can control the input/output of data or operation information in conjunction with the host interface layer (HIL) 220, the flash translation layer (FTL) 240, and the memory interface layer or flash interface layer (FIL) 260. To this end, the buffer manager 280 can set or establish various buffers, caches, or queues in a memory, and control data input/output of the buffers, the caches, or the queues, or data transmission between the buffers, the caches, or the queues in response to a request or a command generated by the host interface layer (HIL) 220, the flash translation layer (FTL) 240, and the memory interface layer or flash interface layer (FIL) 260. For example, the controller 130 may temporarily store read data provided from the memory device 150 in response to a request from the host 102 before providing the read data to the host 102. Also, the controller 130 may temporarily store write data provided from the host 102 in a memory before storing the write data in the memory device 150. When controlling operations such as a read operation, a program operation, and an erase operation performed within the memory device 150, the read data or the write data transmitted or generated between the controller 130 and the memory device 150 in the memory system 110 could be stored and managed in a buffer, a queue, etc. established in the memory by the buffer manager 280. Besides the read data or the write data, the buffer manager 280 can store signal or information (e.g., map data, a read command, a program command, or etc. which is used for performing operations such as programming and reading data between the host 102 and the memory device 150) in the buffer, the cache, the queue, etc. established in the memory. The buffer manager 280 can set, or manage, a command queue, a program memory, a data memory, a write buffer/cache, a read buffer/cache, a data buffer/cache, a map buffer/cache, and etc.

The host interface layer (HIL) 220 may handle commands, data, and the like transmitted from the host 102. By way of example but not limitation, the host interface layer 220 may include a command queue manager 222 and an event queue manager 224. The command queue manager 222 may sequentially store the commands, the data, and the like received from the host 102 in a command queue, and output them to the event queue manager 224, for example, in an order in which they are stored in the command queue manager 222. The event queue manager 224 may sequentially transmit events for processing the commands, the data, and the like received from the command queue. According to an embodiment, the event queue manager 224 may classify, manage, or adjust the commands, the data, and the like received from the command queue. Further, according to an embodiment, the host interface layer 220 can include an encryption manager 226 configured to encrypt a response or output data to be transmitted to the host 102 or to decrypt an encrypted portion in the command or data transmitted from the host 102.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or commands for reading data, i.e., a read command, and a command for programming/writing data, i.e., a write command, may be alternately transmitted to the memory system 110. The command queue manager 222 of the host interface layer 220 may sequentially store commands, data, and the like, which are transmitted from the host 102, in the command queue. Thereafter, the host interface layer 220 may estimate or predict what type of internal operations the controller 130 will perform according to the characteristics of the commands, the data, and the like, which have been transmitted from the host 102. The host interface layer 220 may determine a processing order and a priority of commands, data and the like based on their characteristics. According to the characteristics of the commands, the data, and the like transmitted from the host 102, the event queue manager 224 in the host interface layer 220 is configured to receive an event, which should be processed or handled internally within the memory system 110 or the controller 130 according to the commands, the data, and the like input from the host 102, from the buffer manager 280. Then, the event queue manager 224 can transfer the event including the commands, the data, and the like into the flash translation layer (FTL) 240.

According to an embodiment, the flash translation layer (FTL) 240 may include a host request manager (HRM) 242, a map manager (MM) 244, a state manager 246, and a block manager 248. Further, according to an embodiment, the flash translation layer (FTL) 240 may implement a multi-thread scheme to perform data input/output (I/O) operations. A multi-thread FTL may be implemented through a multi-core processor using multi-thread included in the controller 130. For example, the host request manager (HRM) 242 may manage the events transmitted from the event queue. The map manager (MM) 244 may handle or control map data. The state manager 246 may perform an operation such as garbage collection (GC) or wear leveling (WL), after checking an operating state of the memory device 150. The block manager 248 may execute commands or instructions onto a block in the memory device 150.

The host request manager (HRM) 242 may use the map manager (MM) 244 and the block manager 248 to handle or process requests according to read and program commands and events which are delivered from the host interface layer 220. The host request manager (HRM) 242 may send an inquiry request to the map manager (MM) 244 to determine a physical address corresponding to a logical address which is entered with the events. The host request manager (HRM) 242 may send a read request with the physical address to the memory interface layer 260 to process the read request, i.e., handle the events. In one embodiment, the host request manager (HRM) 242 may send a program request (or a write request) to the block manager 248 to program data to a specific empty page storing no data in the memory device 150, and then may transmit a map update request corresponding to the program request to the map manager (MM) 244 in order to update an item relevant to the programmed data in information of mapping the logical and physical addresses to each other.

The block manager 248 may convert a program request delivered from the host request manager (HRM) 242, the map manager (MM) 244, and/or the state manager 246 into a flash program request used for the memory device 150, to manage flash blocks in the memory device 150. To maximize or enhance program or write performance of the memory system 110, the block manager 248 may collect program requests and send flash program requests for multiple-plane and one-shot program operations to the memory interface layer 260. In an embodiment, the block manager 248 sends several flash program requests to the memory interface layer 260 to enhance or maximize parallel processing of a multi-channel and multi-directional flash controller.

In an embodiment, the block manager 248 may manage blocks in the memory device 150 according to the number of valid pages, select and erase blocks having no valid pages when a free block is needed and select a block including the least number of valid pages when it is determined that garbage collection is to be performed. The state manager 246 may perform garbage collection to move valid data stored in the selected block to an empty block and erase data stored in the selected block so that the memory device 150 may have enough free blocks (i.e., empty blocks with no data).

When the block manager 248 provides information regarding a block to be erased to the state manager 246, the state manager 246 may check all flash pages of the block to be erased to determine whether each page of the block is valid. For example, to determine validity of each page, the state manager 246 may identify a logical address recorded in an out-of-band (OOB) area of each page. To determine whether each page is valid, the state manager 246 may compare a physical address of the page with a physical address mapped to a logical address obtained from an inquiry request. The state manager 246 sends a program request to the block manager 248 for each valid page. A map table may be updated by the map manager 244 when a program operation is complete.

The map manager 244 may manage map data, e.g., a logical-physical map table. The map manager 244 may process various requests, for example, queries, updates, and the like, which are generated by the host request manager (HRM) 242 or the state manager 246. The map manager 244 may store the entire map table in the memory device 150, e.g., a flash/non-volatile memory, and cache mapping entries according to the storage capacity of the memory 144. When a map cache miss occurs while processing inquiry or update requests, the map manager 244 may send a read request to the memory interface layer 260 to load a relevant map table stored in the memory device 150. When the number of dirty cache blocks in the map manager 244 exceeds a certain threshold value, a program request may be sent to the block manager 246, so that a clean cache block is made and a dirty map table may be stored in the memory device 150.

When garbage collection is performed, the state manager 246 copies valid page(s) into a free block, and the host request manager (HRM) 242 may program the latest version of the data for the same logical address of the page and concurrently issue an update request. When the state manager 246 requests the map update in a state in which the copying of the valid page(s) is not completed normally, the map manager 244 may not perform the map table update. This is because the map request is issued with old physical information when the state manger 246 requests a map update and a valid page copy is completed later. The map manager 244 may perform a map update operation to ensure accuracy when, or only if, the latest map table still points to the old physical address.

The memory interface layer or flash interface layer (FIL) 260 may exchange data, commands, state information, and the like, with a plurality of memory chips 252 in the memory device 150 through a data communication method. According to an embodiment, the memory interface layer 260 may include a status check schedule manager 262 and a data path manager 264. The status check schedule manager 262 can check and determine the operating state regarding the plurality of memory chips 252 coupled to the controller 130, the operating state regarding a plurality of channels CH0, CH1, . . . , CHn and the plurality of ways W0, . . . , W_k, and the like. The transmission and reception of data or commands can be scheduled in response to the operating states regarding the plurality of memory chips 252 and the plurality of channels CH0, CH1, . . . , CHn. The data path manager 264 can control the transmission and reception of data, commands, etc. through the plurality of channels CH0, CH1, . . . , CHn and ways W0, . . . , W_k based on the information transmitted from the status check schedule manager 262. According to an embodiment, the data path manager 264 may include a plurality of transceivers, each transceiver corresponding to each of the plurality of channels CH0, CH1, . . . , CHn. Further, according to an embodiment, the status check schedule manager 262 and the data path manager 264 included in the memory interface layer 260 could be implemented as, or engaged with, a memory control sequence generator.

According to an embodiment, the memory interface layer 260 may further include ECC (error correction code) circuitry 266 configured to perform error checking and correction of data transferred between the controller 130 and the memory device 150. The ECC unit 266 may be implemented as a separate module, circuit, or firmware in the controller 130, but may also be implemented in each memory chip 252 included in the memory device 150 according to an embodiment. The ECC circuitry 266 may include a program, a circuit, a module, a system, or an apparatus for detecting and correcting an error bit of data processed by the memory device 150.

For finding and correcting any error of data transferred from the memory device 150, the ECC circuitry 266 can include an error correction code (ECC) encoder and an ECC decoder. The ECC encoder may perform error correction encoding of data to be programmed in the memory device 150 to generate encoded data into which a parity bit is added and store the encoded data in the memory device 150. The ECC decoder can detect and correct error bits contained in the data read from the memory device 150 when the controller 130 reads the data stored in the memory device 150. For example, after performing error correction decoding on the data read from the memory device 150, the ECC circuitry 266 can determine whether the error correction decoding has succeeded or not, and outputs an instruction signal, e.g., a correction success signal or a correction fail signal, based on a result of the error correction decoding. The ECC circuitry 266 may use a parity bit, which has been generated during the ECC encoding process for the data stored in the memory device 150, to correct the error bits of the read data entries. When the number of the error bits is greater than or equal to the number of correctable error bits, the ECC circuitry 138 may not correct the error bits and instead may output the correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The error correction circuitry 138 may include all circuits, modules, systems, and/or devices for performing the error correction operation based on at least one of the above-described codes.

For example, the encoder in the ECC circuitry 266 may generate a codeword that is a unit of ECC-applied data. A codeword of length n bits may include k bits of user data and (n-k) bits of parity. A code rate may be calculated as (k/n). The higher the code rate, the more user data that can be stored in a given codeword. When the length of the codeword is longer and the code rate is smaller, the error correction capability of the ECC circuitry 266 could be improved. In addition, the ECC circuitry 266 performs decoding using information read from the channels CH0, CH1, . . . , CHn. The decoder in the ECC circuitry 266 can be classified into a hard decision decoder and a soft decision decoder according to how many bits represent the information to be decoded. A hard decision decoder performs decoding with a memory cell output information expressed in 1 bit, and the 1-bit information used at this time is called hard decision information. A soft decision decoder uses more accurate memory cell output information composed of 2 bits or more, and this information is called soft decision information. The ECC circuitry 266 may correct errors included in data using the hard decision information or the soft decision information.

According to an embodiment, to increase the error correction capability, the ECC circuitry 266 may use a concatenated code using two or more codes. In addition, the ECC circuitry 266 may use a product code that divides one codeword into several rows and columns and applies a different relatively short ECC to each row and column.

In accordance with an embodiment, a manager included in the host interface layer 220, the flash translation layer (FTL) 240, and the memory interface layer or flash interface layer (FIL) 260 could be implemented with a general processor, an accelerator, a dedicated processor, a co-processor, a multi-core processor, or the like. According to an embodiment, the manager can be implemented with firmware working with a processor.

According to an embodiment, the memory device 150 is embodied as a non-volatile memory such as a flash memory, for example, a Read Only Memory (ROM), a Mask ROM (MROM), a Programmable ROM (PROM), an Erasable ROM (EPROM), an Electrically Erasable ROM (EEPROM), a Magnetic (MRAM), a NAND flash memory, a NOR flash memory, or the like. In another embodiment, the memory device 150 may be implemented by at least one of a phase change random access memory (PCRAM), a Resistive Random Access Memory (ReRAM), a ferroelectrics random access memory (FRAM), a transfer torque random access memory (STT-RAM), and a spin transfer torque magnetic random access memory (STT-MRAM), or the like.

FIG. 11 illustrates a data storage system according to an embodiment of the present disclosure. FIG. 11 shows a memory system including multiple cores or multiple processors, which is an example of a data storage system. The memory system may support the Non-Volatile Memory Express (NVMe) protocol.

The NVMe is a type of transfer protocol designed for a solid-state memory that could operate much faster than a conventional hard drive. The NVMe can support higher input/output operations per second (IOPS) and lower latency, resulting in faster data transfer speeds and improved overall performance of the data storage system. Unlike SATA which has been designed for a hard drive, the NVMe can leverage the parallelism of solid-state storage to enable more efficient use of multiple queues and processors (e.g., CPUs). The NVMe is designed to allow hosts to use many threads to achieve higher bandwidth. The NVMe can allow the full level of parallelism offered by SSDs to be fully exploited. However, because of limited firmware scalability, limited computational power, and high hardware contention within SSDs, the memory system might not process a large number of I/O requests in parallel.

Referring to FIG. 11, the host, which is an external device, can be coupled to the memory system through a plurality of PCIe Gen 3.0 lanes, a PCIe physical layer 412, and a PCIe core 414. A controller 400 may include three embedded processors 432A, 432B, 432C, each using two cores 302A, 302B. Herein, the plurality of cores 302A, 302B or the plurality of embedded processors 432A, 432B, 432C may have a pipeline structure.

The plurality of embedded processors 432A, 432B, 432C may be coupled to the internal DRAM controller 434 through a processor interconnect. The controller 400 further includes a Low Density Parity-Check (LDPC) sequencer 460, a Direct Memory Access (DMA) engine 420, a scratch pad memory 450 for metadata management, and an NVMe controller 410. Components within the controller 400 may be coupled to a plurality of channels connected to a plurality of memory packages 152 through a flash physical layer 440. The plurality of memory packages 152 may correspond to the plurality of memory chips 252 described in FIG. 10.

According to an embodiment, the NVMe controller 410 included in the controller 400 is a type of storage controller designed for use with solid state drives (SSDs) that use an NVMe interface. The NVMe controller 410 may manage data transfer between the SSD and the computer CPU as well as other functions such as error correction, wear leveling, and power management. The NVMe controller 410 may use a simplified, low-overhead protocol to support fast data transfer rates.

According to an embodiment, a scratch pad memory 450 may be a storage area set by the NVMe controller 410 to temporarily store data. The scratch pad memory 450 may be used to store data waiting to be written to a plurality of memory packages 152. The scratch pad memory 450 can also be used as a buffer to speed up the writing process, typically with a small amount of Dynamic Random Access Memory (DRAM) or Static Random Access Memory (SRAM). When a write command is executed, data may first be written to the scratch pad memory 450 and then transferred to the plurality of memory packages 152 in larger blocks. The scratch pad memory 450 may be used as a temporary memory buffer to help optimize the write performance of the plurality of memory packages 152. The scratch pad memory 450 may serve as intermediate storage of data before the data is written to non-volatile memory cells.

The Direct Memory Access (DMA) engine 420 included in the controller 400 is a component that transfers data between the NVMe controller 410 and a host memory in the host system without involving a host's processor. The DMA engine 420 can support the NVMe controller 410 to directly read or write data from or to the host memory without intervention of the host's processor. According to an embodiment, the DMA engine 420 may achieve or support high-speed data transfer between a host and an NVMe device, using a DMA descriptor that includes information regarding data transfer such as a buffer address, a transfer length, and other control information.

The Low Density Parity Check (LDPC) sequencer 460 in the controller 400 is a component that performs error correction on data stored in the plurality of memory packages 152. Herein, an LDPC code is a type of error correction code commonly used in a NAND flash memory to reduce a bit error rate. The LDPC sequencer 460 may be designed to immediately process encoding and decoding of LDPC codes when reading and writing data from and to the NAND flash memory. According to an embodiment, the LDPC sequencer 460 may divide data into plural blocks, encode each block using an LDPC code, and store the encoded data in the plurality of memory packages 152. Thereafter, when reading the encoded data from the plurality of memory packages 152, the LDPC sequencer 460 can decode the encoded data based on the LDPC code and correct errors that may have occurred during a write or read operation. The LDPC sequencer 460 may correspond to the ECC module 266 described in FIG. 10.

In addition, although FIGS. 10 and 11 illustrate an example of a memory system including a memory device 150 or a plurality of memory packages 152 capable of storing data, the data storage system according to an embodiment of the present disclosure may not be limited to the memory system described in FIGS. 10 and 11. For example, the memory device 150, the plurality of memory packages 152, or the data storage device controlled by the controllers 130, 400 may include non-volatile or non-volatile memory devices. In FIG. 11, it is described that the controller 400 can perform data communication with the host 102 externally placed from the memory system (see FIG. 10) through an NVM Express (NVMe) interface and a PCI Express (PCIe). In an embodiment, the controller 400 may perform data communication with at least one host through a protocol such as a Compute Express Link (CXL).

Additionally, according to an embodiment, an apparatus and method for performing distributed processing or allocation/reallocation of the plurality of instructions in a controller including multi processors of the pipelined structure according to an embodiment of the present disclosure can be applicable to a data processing system including a plurality of memory systems or a plurality of data storage devices. For example, a Memory Pool System (MPS) is a very general, adaptable, flexible, reliable and efficient memory management system where a memory pool such as a logical partition of primary memory or storage reserved for processing a task or group of tasks could be used to control or manage a storage device coupled to the controller. The controller including multi processors in the pipelined structure can control data and program transfer to the memory pool controlled or managed by the memory pool system (MPS).

As above described, a memory device or a memory system according to an embodiment of the present disclosure can determine an increase in a read count based on a read disturbance caused by a read operation within a memory block, so that the memory device or the memory system can secure or improve data stability based on read counts determined or calculated for the corresponding memory block and surrounding memory blocks of the corresponding memory block.

Further, a memory device or a memory system according to an embodiment of the present disclosure can improve safety of data stored in the memory device, reduce an error that may occur during a data input/output operation, and improve performance of data input/output operations.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device, are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, generators, logic, interfaces, decoders, drivers, and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, generators, logic, interfaces, decoders, drivers, and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, generators, logic, interfaces, decoders, drivers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods or operations of the computer, processor, microprocessor, controller, or other signal processing device, are described in detail, the code or instructions for implementing the operations of the method embodiments may transform the computer, processor, controller, or other signal processing device into a special-purpose processor for performing the methods described herein.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A memory device comprising:
an open memory block including at least one first page having an erased state; and
control circuitry configured to:
perform a read operation for a page included in the open memory block,
determine a weight based on a ratio of a number of the at least one first page in the open memory block to a total number of pages in the open memory block,
determine a read count subject to the read operation based on the weight, and
control the open memory block based on the read count.

2. The memory device according to claim 1, wherein the control circuitry is configured to determine the weight to increase the read count by more than twice in a case that the ratio is greater than a first threshold, compared to when the ratio is equal to or less than the first threshold.

3. The memory device according to claim 2, wherein the first threshold is determined based on program/erase (P/E) cycles of the open memory block.

4. The memory device according to claim 2, wherein the control circuitry determines the weight higher in a case that a first string of the page in the open memory block shares a layer with a second string in another memory block, compared to when the layer is not shared by the first and second strings.

5. The memory device according to claim 1, wherein the control circuitry is configured to determine, when all pages in the open memory block are programmed, the weight higher in a case that a first string of the page in the open memory block shares a layer with a second string in another memory block, compared to when the first string does not share the layer with the second string.

6. The memory device according to claim 5, wherein the control circuitry determines the weight higher for the first string than for the second string.

7. The memory device according to claim 1, wherein the control circuitry is further configured to perform data migration from the open memory block to a free memory block when the read count determined based on the weight is higher than a second threshold.

8. The memory device according to claim 1, wherein the control circuitry is further configured to:

change the open memory block to a closed memory block when the open memory block does not include the at least one first page having the erase state after a program operation; and determine a read count for the closed memory block without determining the weight.

\* \* \* \* \*